W. C. ABBOTT.
CAR FENDER.
APPLICATION FILED NOV. 25, 1914.
1,156,737.
Patented Oct. 12, 1915.
3 SHEETS—SHEET 1.
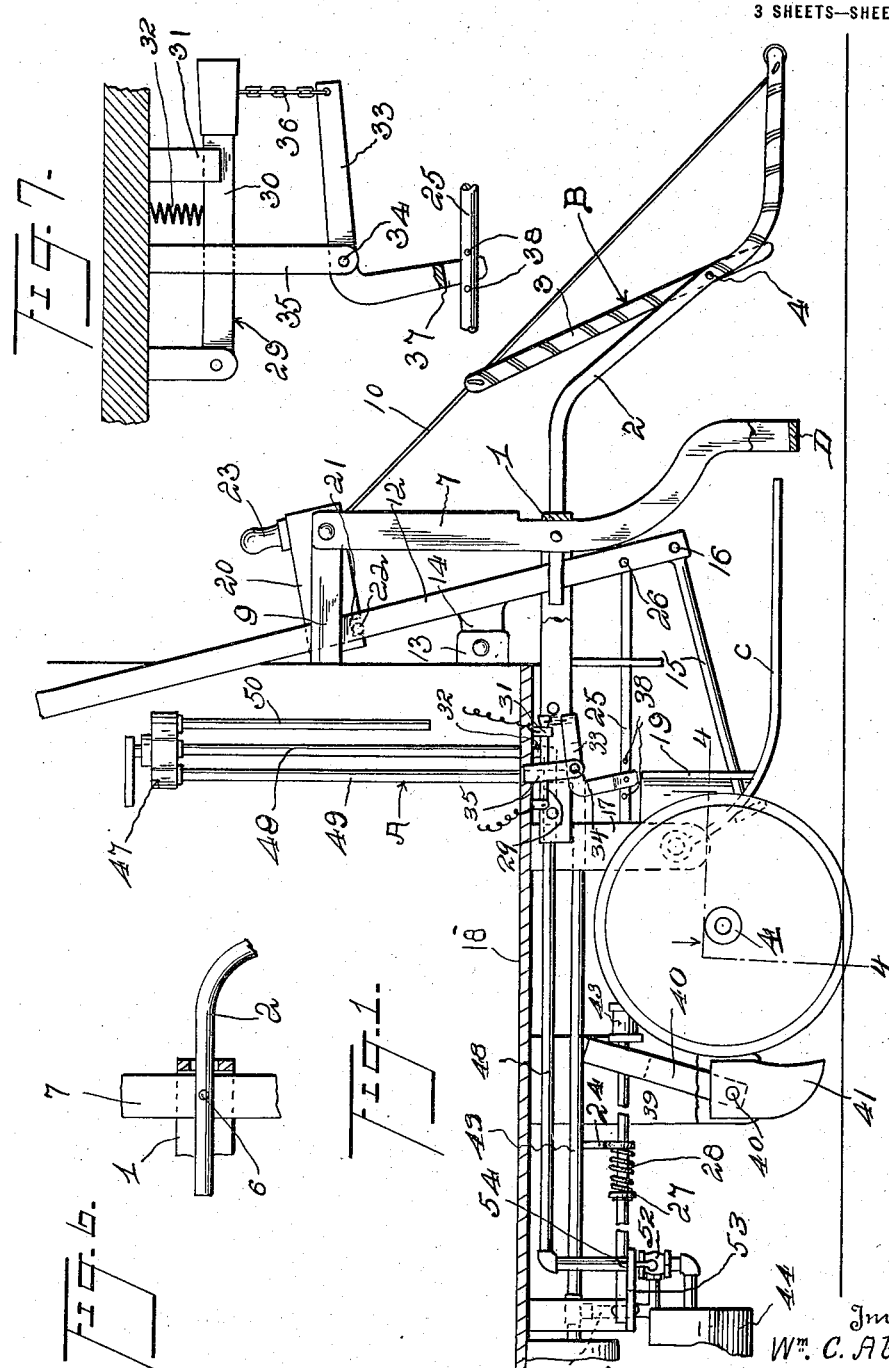

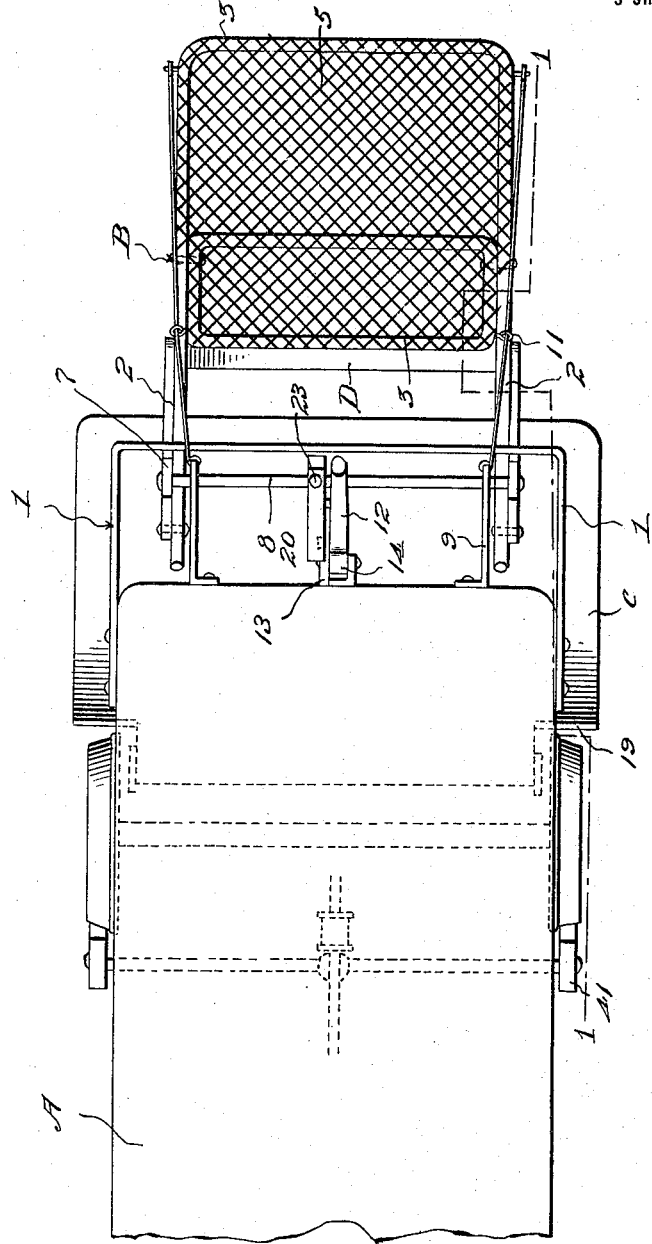

W. C. ABBOTT.
CAR FENDER.
APPLICATION FILED NOV. 25, 1914.
1,156,737.
Patented Oct. 12, 1915.
3 SHEETS—SHEET 3.
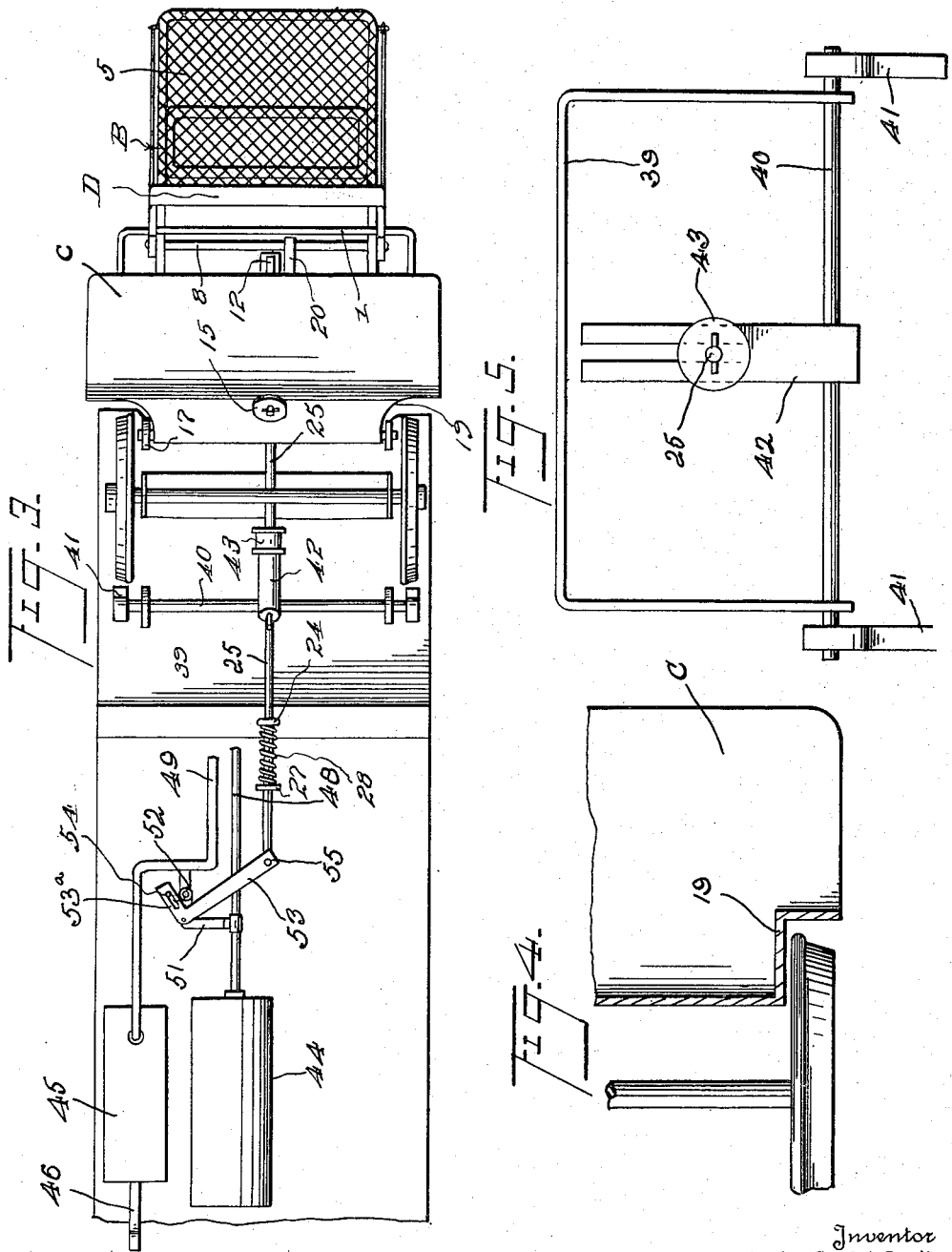

UNITED STATES PATENT OFFICE.

WILLIAM C. ABBOTT, OF BALTIMORE, MARYLAND.

CAR-FENDER.

1,156,737.  Specification of Letters Patent.  Patented Oct. 12, 1915.

Application filed November 25, 1914. Serial No. 874,031.

*To all whom it may concern:*

Be it known that I, WILLIAM C. ABBOTT, a citizen of the United States, residing at Baltimore, State of Maryland, have invented certain new and useful Improvements in Car-Fenders; and I do hereby declare the following to be a full, clear, and exact description of the invention, such as will enable others skilled in the art to which it appertains to make and use the same.

My invention relates to improvements in fenders for power driven vehicles, particularly street cars, and has for its primary object to provide a fender, which when struck by an object on the track will operate to cut off the current to the motors and bring about application of the brakes of the car, thus automatically stopping the car.

Another object is to provide simple and effective means to cut off the current and effect an application of the brakes and move an auxiliary fender into operative position, directly in front of the front wheels of the car, simultaneously, when the main fender is struck.

Another object is to improve fenders of the character described so as to render them more practical and simple as to construction in order that they may be easily attached to various kinds of vehicles without materially increasing the cost of manufacture thereof.

One of the most important objects of my invention is to provide means arranged between the main and auxiliary fenders at a point slightly spaced from the track surface which will prevent an object or person from falling between the main and auxiliary fenders and passing under the auxiliary fender, said means being connected with the device in such manner that when engaged by an object, the auxiliary fender is thrown into operative position and the car brought to a stop.

The above and additional objects are accomplished by such means as are illustrated in the accompanying drawings, described in the following specification and then more particularly pointed out in the claims.

With reference to the drawings, wherein I have illustrated the preferred embodiment of my invention as it is reduced to practice, and throughout the several views of which similar reference numerals designate corresponding parts: Figure 1 is a fragmentary longitudinal sectional view taken through a street car on the line 1—1 of Fig. 2 showing my improved fender attached thereto and in side elevation, Fig. 2 is a fragmentary plan view of the fender showing it attached to the car, Fig. 3 is a bottom plan view of the car showing the mechanism assembled and attached thereto. Fig. 4 is a fragmentary detail horizontal sectional view taken on line 4—4 of Fig. 1, Fig. 5 is an enlarged front elevation of a part of the emergency braking means, Fig. 6 is an enlarged detail sectional view showing the manner of connecting the main fender frame with the car, and Fig. 7 is an enlarged detail side elevation of the means for cutting off the current to the motors.

Referring to the drawings by characters of reference, A designates as an entirety, a street car, B the main fender attached to the forward end thereof and C an auxiliary fender arranged in rear of the main fender and in front of the forward wheels of the car. Secured to the forward end of the car is a U-shaped frame 1 which carries a U-shaped main fender frame 2. The side arms of the main fender frame are slidable through openings in the transverse portion of the fender supporting frame 1. These side arms extend outwardly in a horizontal plane from the frame 1 which is disposed in a horizontal plane, then downwardly and forwardly, and terminate in horizontally disposed front portions as shown in Fig. 1. A rectangular top frame 3 is carried between the side bars of the fender frame 2 and is pivoted adjacent to its lower end as at 4 to said side bars at a point intermediate the ends thereof. A fender net 5 is secured to the top frame 3 and to the front cross bar or portion of the fender frame 2, and also to parts of the side bars thereof, as shown in Figs. 1 and 2. It will thus be seen that the top frame 3 is permitted movement relative to the portion of the frame that is carried between the forward extremities of the side bars of the U-shaped frame 2. The ends of the side arms of the frame 2 are pivoted as at 6 to the free ends of an inverted U-shaped frame or lever 7. The frame or lever 7 is disposed in approximately vertical position and has its pivot portion 8 rotatably journaled in supporting arms 9 that are secured to the forward part of the car A and extend outwardly therefrom in a horizontal plane. Stay wires 10 are secured at their ends to the arms 9 and forward portions of the side bars 2. Eyes 11 are carried by the frame 3 adjacent to the upper end thereof and on opposite sides, and receive the stay rods or elements 10.

A substantially upright operating lever 12 is pivoted intermediate its ends to a bracket 13 carried at the front of the car A. An ear 14 is carried by the lever 12 and said ear is pivoted to the bracket so as to space the lever from the car. A rod 15 is pivoted at one end as at 16 to the lower extremity of the lever 12 and at its other end is loosely connected with the auxiliary fender C. The auxiliary fender C is of the scoop type and is pivoted at its upper end between depending arm 17 secured to the platform 18 of the car A. The fender C is of greater width than the forward truck of the car, that is to say, extends beyond the wheels of the car on either side thereof and is formed at a point adjacent to its upper end with angularly and upwardly directed portions 19 that are shaped to guard the wheels. The fender C is arranged adjacent to the wheels and is normally supported in up position as shown in Fig. 1 and when moved into operative position has its lower edge disposed in close relation to the track thus positively preventing persons from being run over by the wheels of a car or struck by the wheels.

A trigger 20 is fixed to the rotary pivot portion 8 of the frame 7 at a point intermediate the ends of said pivot portions 8 and is formed on one side face with a pin receiving recess 21 that is designed to receive a pin 22 which is carried by the lever 12. The pin and recess are so arranged that when the lever is moved at its upper end toward the car, or is in normal position, the pin will fit within the recess and hold the lever in such position. A handle 23 is provided on the trigger 20 to provide for the manual operation of the device or the setting of the trigger. When the fender B is struck it yields or moves inwardly causing the side bars of the frame 2 to move the side bars of the frame 7 inwardly and rotate the pivot portion 8 of the frame 7. When the web portion 8 is rotated as described, the trigger 20 will move upwardly and out of coöperation with the pin 22. Through the action of a spring actuated member which will be later more fully described, the lever 12 is pulled so that the auxiliary fender C is allowed to drop into operative position and other mechanism which will be later more fully described, is operated.

Mounted in a suitable depending bearing 24 that is carried on the bottom of the car A is a slidable operating rod 25 which is pivoted as at 26 to the lower portion of the lever 12. A pin 27 is inserted transversely through the rod 25 and interposed between the pin 27 and bracket 24 is a helical expansive spring 28, which is, when the mechanism is in normal position, under tension and which operates to communicate a pull to the rod 25 when the lever 12 is released.

As a means for cutting off the current to the motors of the car A, I provide a knife switch 29 that is secured at a point underneath the car and adjacent to the controller box, not shown, and is operatively connected in the electrical circuit for the car. The knife blade for this switch is normally held in contacting engagement with the contact 31 by means of a retractile spring 32.

A bell crank 33 is pivoted intermediate its ends as at 34 to the lower end of a depending arm 35 that is secured to the platform 18 of the car A and one end of the bell crank is connected by means of a flexible element 36 to the handle of the knife 30 of the switch 29. The other end of the bell crank is bifurcated as at 37 and slidably receives the rod 25. Projections 38 are carried upon the rod 25 and are spaced from one another and arranged on opposite sides of the bifurcated terminals 37 of the bell crank 33 thus when the rod is moved or better a pull communicated thereto, the bell crank is rocked and the switch blade 30 pulled out of contact with the contact member 31 breaking the circuit for the motors of the car.

I provide emergency braking means which comprises an inverted U-shaped frame 39 that is secured at its web portion to the under part of the car A and has journaled in its free end and transversely thereof a rotary shaft 40. The ends of the shaft extend beyond the side arms of the frame 39 and have fixed thereto brake shoes 41 arranged to contact with the forward wheels of the car. An upstanding longitudinally slotted operating member 42 is fixed to the shaft 40 and slidably receives in the slotted portion thereof the rod 25. A collar 43 is fixed to the shaft 40 at a point in advance of the operating member 42 so that when the rod 25 is pulled inwardly, the member 42 will be moved accordingly and will effect a rotary movement of the shaft 40 resulting in the application of the brake shoes 41. It will thus be seen that simultaneously with the moving of the auxiliary fender into operative position and the cutting off of the current to the motors, the emergency braking means will be operated.

The car A is equipped with the ordinary air brake apparatus which includes an air tank 44, brake cylinder 45 and a piston rod 46 connected with the brake cylinder and with the brake rigging, not shown.

A motorman or engineer's valve 46 of the ordinary construction is carried by the car A and a pipe 48 connects the air tank. A pipe 49 leads from the valve 47 to the brake cylinder 45 and communication with the pipes 48 and 49 is had by means of the valve 47. A vent pipe 50 is connected with the valve 47 and may be communicated with the pipe 49 by means of the valve 47. A branch pipe 51 connects the pipes 48 and 49 with one another at a point adjacent to the tank 44 and brake cylinder 45 and a rotary valve 52 is mounted in the pipe 51 at a point adjacent to its connection with the pipe 49. A bell crank 53 is pivoted to a suitable bracket carried upon the under part of the car A and is provided with a slotted end 53ᵃ which slidably receives an angular valve handle 54 that is connected with the valve 52. The other end of the bell crank 53 is pivoted as at 55 to the rear end of the operating rod 25. It will be seen that when the rod 25 is pulled inwardly, the bell crank 52 will move so as to open the valve 52 and allow the air to flow from the pipe 48 through the pipes 51 and 49 to brake cylinder 45. The application of the brakes is thus brought about automatically when the fender strikes an object. The spring 28 returns the mechanism to normal position.

As a means for preventing an object from falling between the main and auxiliary fenders and passing under the auxiliary fender when the same is in up position, I extend the side arms of the frame 7 downwardly and forwardly to a point slightly spaced from the track surface and connect the lower ends by means of a horizontal bar D. The bar D is disposed in a horizontal plane and is within several inches of the ground. The means described is arranged in advance of the fender C. Thus when an object between the main and auxiliary fenders is struck by the bar D of the extended parts of the frame 7 the part 8 of the frame 7 will be rotated and as previously described, the various mechanisms operated to bring the car to a stop.

With reference to the foregoing description and accompanying drawings it will be observed that I have provided a fender which when struck by an object will operate to automatically move the auxiliary fender into operative position to cut off the current to the motors for the car and bring about an emergency application of the brakes thus quickly stopping the car.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as claimed.

What is claimed is:—

1. The combination with a car, of a main fender slidably mounted on the car, an auxiliary fender pivotally mounted beneath the car in rear of the main fender, an upright operating lever fulcrumed intermediate of its ends at a point between the said fenders and having its lower arm operatively connected with the main fender so as to move upon the inward movement of the said main fender, means extending from the lower arm of the operating lever to the auxiliary fender for swinging the same downward when the said lower arm moves rearwardly, an operating rod slidably mounted on the car and connected with the operating lever, and brake mechanism connected with the operating rod.

2. In a car fender the combination with a car, having a brake and provided with propelling means, of a main fender slidingly supported on the car, an auxiliary fender hinged to the car in rear of the main fender and normally disposed in an inoperative position, an operating lever pivotally mounted intermediate of its ends and operatively connected with the main fender so as to move therewith, an operating rod slidably carried by the car and pivotally connected with the said operating lever, a rod connected with the auxiliary fender and pivotally connected with the operating lever, means for operatively connecting the operating rod with the brake, whereby when the operating rod is moved in one direction the brake will be applied, spring means for normally holding the operating rod in an inoperative position, means to releasingly hold the lever in an inoperative position, the last mentioned means being connected with the main fender and adapted to be moved to releasing position, when the said main fender is struck and means for connecting the operating rod with the propelling means of the car for stopping the latter.

3. In a car fender the combination with a car having a brake and provided with propelling means, of a main fender slidably mounted on the car, an auxiliary fender movably mounted on the car in rear of the main fender and normally disposed in inoperative position, an operating lever operatively connected with the main fender to move with the same, an operating rod slidably mounted on the car and pivotally connected with the operating lever, means for connecting the auxiliary fender with the operating lever, means for operatively connecting the said rod with the brake, means for releasingly holding the operating lever in an inoperative position, the last mentioned means being operatively connected with the main fender and adapted to be moved to a releasing position when the main fender is struck, and means for operatively connecting the said rod with the propelling means for stopping the car when the main fender is struck.

4. In a car fender the combination with a car, of a main fender yieldably mounted on the car, an auxiliary fender adjustably connected with the car and arranged in rear of the main fender, an operating lever located between and connected with the said fenders and adapted to move upon the yielding of the main fender, an operating rod slidably mounted on the car and connected with the said operating lever, a switch carried by the car, and a bell crank lever fulcrumed on the car and having one arm connected with the said operating rod and its other arm connected with the said switch.

In testimony whereof I affix my signature in presence of two witnesses.

WILLIAM C. ABBOTT.

Witnesses:
JOHN W. BACKER, Jr.,
GEORGE D. LIST.

Copies of this patent may be obtained for five cents each, by addressing the "Commissioner of Patents, Washington, D. C."